Sept. 15, 1959     I. HOROWITZ     2,904,359
CORNER FITTINGS
Filed Nov. 7, 1957
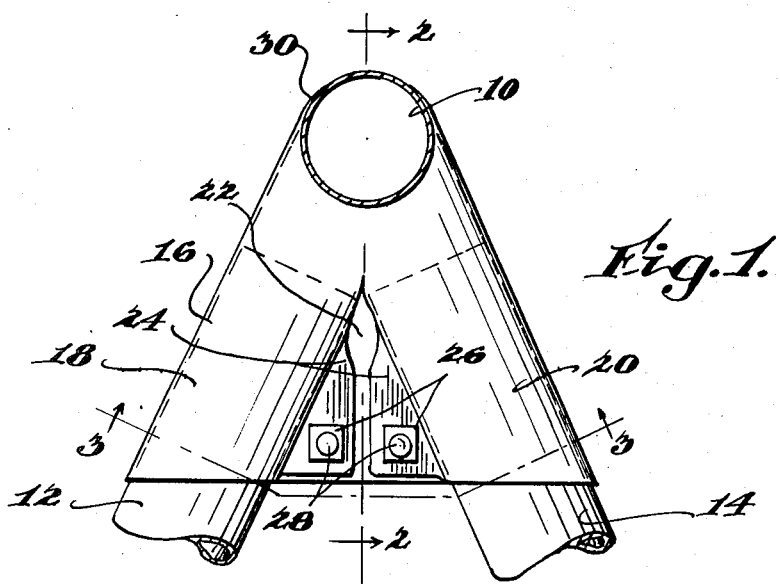
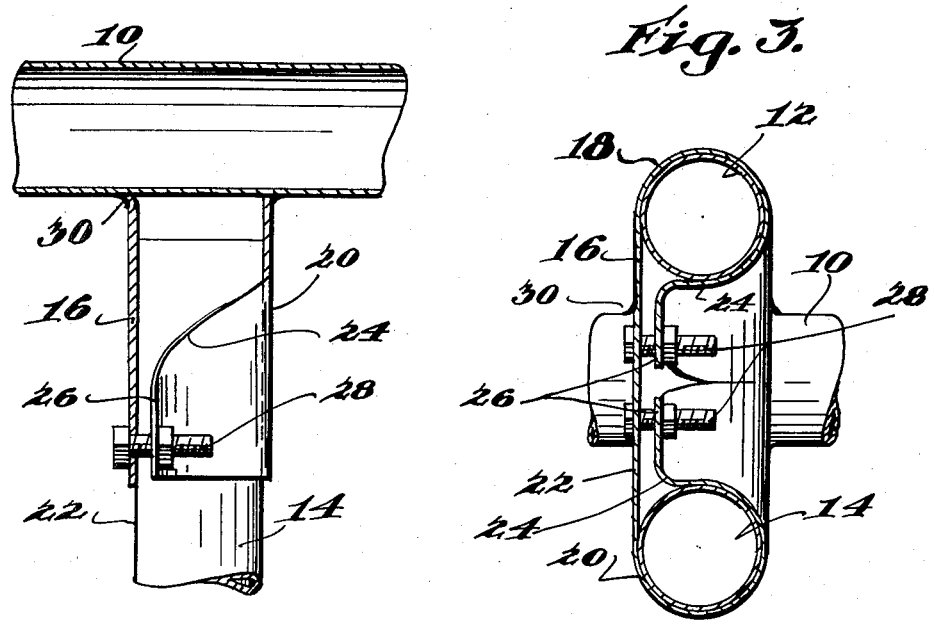
INVENTOR
Isadore Horowitz
BY
ATTORNEY

United States Patent Office 2,904,359
Patented Sept. 15, 1959

2,904,359

CORNER FITTINGS

Isadore Horowitz, Shreveport, La., assignor to Universal Manufacturing Co., Inc., Bossier City, La., a corporation of Louisiana Application November 7, 1957, Serial No. 695,049

3 Claims. (Cl. 287—54)

This invention relates to corner fittings and the method of forming for use in connection with tubular constructions and is particularly adaptable for playground apparatus where, at the junction of the converging supports and top horizontal bar the connections must be sturdy and strong, capable of withstanding the resultant strain at these locations.

These top corner fittings, of malleable iron, steel, cast iron, aluminum or any suitable metal, are formed on an especially designed machine in a single operation and after the leg supports have been inserted into the sockets an appropriate distance, subsequent to welding of the corner fitting to the top horizontal bar, the nuts on the flat web wing portions are then tightened, forming pressure against the support ends to securely hold them in position, minimizing the resultant strain and the loosening usually occasioned at the junction of the component parts of the playground apparatus. Although particularly adapted for playground apparatus, it is obvious that this sturdy assembly could be used in connection with other gymnasium structure, tressels, horses, and other tubular constructions where a strain usually occurs at the connections of component parts of the apparatus.

In conventional apparatus, the customary means for securing the intersecting angularly disposed shafts and tubings, such as in slides, gym sets, and other playground apparatus, have been very unsatisfactory due to the failure of the connections to withstand the wear and strain where most needed. The constant use the structures receive tend to weaken the connections and often separation of the parts necessitating constant repair or even replacement. The subject invention has been designed to overcome these difficulties by the provision of rigid, sturdy and rugged connections to reduce the weakening of the parts to a minimum.

It is an object of my invention to provide a corner fitting formed in a single machine operation.

Another object is to provide adequate connections for adjustably positioning the ends of the supporting tubing.

A further object is to integrally secure all converging component parts of the apparatus at the junction with the top bar of the playground apparatus.

A still additional objective is the method of forming the corner fitting and the assembly of the component parts of the connections for the playground apparatus.

Other and additional objects of the invention will become apparent from consideration of the following detailed description taken in connection with the accompanying drawing forming part of the disclosure, with the understanding that the subject invention is not confined to a strict conformity with the showing in the drawing but may be changed or modified within the scope of the appended claims.

In the drawings:

Figure 1 is a front elevation of a tubular corner fitting taken through an end of a horizontal top bar of a playground apparatus with the converging tubular leg supports broken away.

Figure 2 is a vertical sectional view taken on the lines 2—2 of Figure 1, while

Figure 3 is a bottom plan view taken on the lines 3—3 of Figure 1 looking upward of the connection.

In the drawings where similar structure is denoted by comparable reference characters, the numeral 10 refers to the top horizontal bar of the playground apparatus while 12 and 14 refer to the converging leg or support members.

The unitarily formed corner fitting, converging at its top, is designated at 16 and is provided with two converging or tubular sockets 18 and 20. The rear surface or face 22 is flat while the ends 24 are bent at approximately right angles and terminate in flat wings or webs 26, lying in the same plane, immediately adjacent each other, and spaced an appreciable distance from the flat rear face.

Aligned openings are provided in this rear face plate 22 and the flat web portions 26 to receive bolt and nut securing means 28.

It is to be noticed that the bifurcated inner ends 24 are spread slightly apart immediately of the center on the inner side and then radiate outwardly and upwardly, completely encircling the upper ends of the converging supports, which enables an adequate amount of relative movement when the nuts are tightened to firmly secure the converging tubular supports 12 and 14.

In assembly of the parts at this location, after the fitting has been welded or otherwise secured at 30 to the top horizontal bar 10, the tubular leg supports 12 and 14 are inserted into the converging sockets of the fitting for proper location therein and then the nuts are tightened, forming pressure against the ends of the tubular supports, drawing the webbed flat wings 26 inwardly toward the rear face plate 22 to firmly hold the supports, fitting and horizontal bar together as a unit.

It can be appreciated that the subject corner fitting also allows adequate adjustment of the distance the tubular leg supports extend within the fitting sockets to insure adequate positioning of the component parts of the apparatus. Further, by forming the corner fittings unitarily to the horizontal top bar the possibility of distortion or movement of the associated parts is eliminated.

It will be obvious to those skilled in the art that various changes may be made in the invention without departing from the spirit and scope thereof, and therefore the invention is not limited by that shown in the drawing and described in the specification but only as indicated broadly in the appended claims.

I claim:

1. In a corner fitting for a playground apparatus having a horizontal top bar and two converging tubular leg supports at each end thereof, said corner fitting integrally secured to said top horizontal bar encircling at least ninety percent of the peripheries of the upper ends of said leg supports forming a flat rear face, the ends of which terminate in directly opposed parallel flat web portions spaced from said rear face and lying in the same plane but spaced inwardly of the axis of said converging leg supports, said rear face and flat web portions being separately bolted together whereby tension is put on said fitting to firmly secure said tubular leg supports against dislodging from the connection with said horizontal top bar.

2. In a corner fitting for a playground apparatus having a horizontal top bar and two converging tubular leg supports at each end thereof, said corner fitting integrally secured to said top horizontal bar encircling at least ninety percent of the peripheries of the upper ends of said leg supports forming a rear flat face, the ends of which terminate in directly opposed parallel flat web portions spaced from said rear face and lying in the same plane but spaced inwardly of the axis of said converging leg supports, and flat web portions and said rear face being separately bolted together whereby tension is put on said fitting to firmly secure said tubular leg supports against dislodgement from the connection with said horizontal top bar, said rear face and spaced web portions positioned at right angles to said horizontal top bar.

3. In a corner fitting for a playground apparatus having a horizontal top bar and two converging tubular leg supports at each end thereof, said corner fitting integrally secured to said horizontal top bar encircling at least ninety percent of the peripheries of the upper ends of said leg supports forming a rear flat face, the ends of which terminate in directly opposed parallel flat web portions spaced from said rear face and lying in the same plane but spaced inwardly of the axis of said converging leg supports, said flat web portions and said rear face being separately bolted together whereby tension is put on said fitting to firmly secure said tubular leg supports against dislodgement from the connection with said horizontal top bar, said rear face and spaced web portions positioned at right angles to said horizontal top bar, and the top edges of said spaced web portions turned inwardly and upwardly whereby the extreme top ends of said tubular leg supports are completely encircled.

References Cited in the file of this patent

UNITED STATES PATENTS

| | | |
|---|---|---|
| 2,696,396 | Pittaluga | Dec. 7, 1954 |
| 2,705,162 | Linsky | Mar. 29, 1955 |
| 2,711,917 | Blu | June 28, 1955 |
| 2,763,455 | Scaramucci | Sept. 18, 1956 |